United States Patent
Ishikawa

(10) Patent No.: US 7,117,759 B2
(45) Date of Patent: *Oct. 10, 2006

(54) WAVE GEAR DRIVE WITH WIDE MESH THREE-DIMENSIONAL TOOTH PROFILE

(75) Inventor: Shoichi Ishikawa, Yokohama (JP)

(73) Assignee: Harmonic Drive Systems, Inc., Tokyo (JP)

( * ) Notice: Subject to any disclaimer, the term of this patent is extended or adjusted under 35 U.S.C. 154(b) by 183 days.

This patent is subject to a terminal disclaimer.

(21) Appl. No.: 10/927,168

(22) Filed: Aug. 27, 2004

(65) Prior Publication Data

US 2005/0044986 A1   Mar. 3, 2005

(30) Foreign Application Priority Data

Aug. 29, 2003  (JP) ............................. 2003-305826
Dec. 15, 2003  (JP) ............................. 2003-416815

(51) Int. Cl.
*F16H 55/14*      (2006.01)
(52) U.S. Cl. ........................ 74/461; 74/457; 475/904
(58) Field of Classification Search ............... 74/640, 74/462, 457, 460, 461
See application file for complete search history.

(56) References Cited

U.S. PATENT DOCUMENTS 2,906,143 A      9/1959   Musser
4,703,670 A  *  11/1987   Kondo ......................... 74/640
5,458,023 A  *  10/1995   Ishikawa et al. .............. 74/640
5,662,008 A  *   9/1997   Aubin et al. .................. 74/640
5,782,143 A  *   7/1998   Ishikawa ...................... 74/640
5,918,508 A  *   7/1999   Ishikawa ...................... 74/640
6,101,892 A  *   8/2000   Berlinger et al. ............. 74/462
6,167,783 B1 *   1/2001   Ishikawa ...................... 74/640
6,230,587 B1 *   5/2001   Grill .......................... 74/640
6,467,375 B1 *  10/2002   Ishikawa ...................... 74/640
6,526,849 B1 *   3/2003   Ishikawa ...................... 74/640
6,799,489 B1 *  10/2004   Ishikawa ...................... 74/640

FOREIGN PATENT DOCUMENTS

| JP | 45-41171   | 12/1970 |
| JP | 63-115943  | 5/1988  |
| JP | 64-079448  | 3/1989  |
| JP | 07-167228  | 7/1995  |

* cited by examiner

*Primary Examiner*—Charles A. Marmor
*Assistant Examiner*—Justin K. Holmes
(74) *Attorney, Agent, or Firm*—Buchanan Ingersoll & Rooney PC

(57) ABSTRACT

A wave gear drive in which wide-area meshing of the rigid internal gear and flexible external gear is achieved, reducing stresses on the bottom rim of the gear teeth and in the vicinity of the major axis of the inner ring surfaces of the wave generator, thereby improving the load capabilities of the wave gear drive.

2 Claims, 7 Drawing Sheets

WAVE GEAR DRIVE WITH WIDE MESH THREE-DIMENSIONAL TOOTH PROFILE

TECHNICAL FIELD

The present invention relates to an improved tooth profile for teeth used in a rigid internal gear and a flexible external gear of a wave gear drive.

BACKGROUND ART

Since the wave gear drive was invented by C. W. Musser (see U.S. Pat. No. 2,906,143), various types of wave gear drive have been invented by many researchers, including Musser and the present inventor. There have also been various inventions relating to the tooth profile of the gears used in wave gear drives. The present inventor has proposed making the basic tooth profile an involute tooth profile (see JP-B 45-41171), and a method of designing a tooth profile in which the addendum profiles for wide contact between the rigid internal gear and flexible external gear are derived using a rack approximation of the meshing between the two gears (see JP-A 63-115943 and JP-A 64-79448). There has also been proposed an invention for avoiding interference between rack-approximated tooth profiles (see JP-A 7-167228).

There is a strong market demand for wave gear drives with improved performance, especially improved load capability. The main elements that govern the load capability of a wave gear drive are the fatigue strength of the tooth bottom rim of the flexible external gear and the fatigue strength of the inner rolling contact surface of the wave generator, particularly at locations in the vicinity of the major axis of the elliptically deformed flexible external gear.

An object of the present invention is to provide a wave gear drive having a tooth profile that is able to reduce the stresses generated at the above two locations.

DISCLOSURE OF THE INVENTION

In accordance with the present invention, the above and other objects can be attained by providing a wave gear drive having a rigid internal gear, a flexible external gear and a wave generator that flexes the external gear into an elliptical shape so that the external gear meshes partially with the rigid internal gear and rotates mesh locations of the two gears circumferentially, the flexible external gear comprising a cylindrical body, a diaphragm extending radially outward or inward from one end of the cylindrical body, and external teeth formed around an outer periphery of an opening portion at another end of the cylindrical body, the cylindrical body being flexed radially into an elliptical shape by the wave generator with an amount of said flexing in the radial direction increasing substantially proportional to a distance to the opening portion end from the diaphragm side, wherein a main portion of a tooth profile of the flexible external gear as a spur gear is an arc, in a section of said opening portion of the flexible external gear perpendicular to the axis, a meshing center position between teeth of the two gears is at a point away from the major axis of a center line of an elliptical rim of the flexible external gear, with $\theta$ as an angle of inclination of a tangent with the meshing center position along the neutral line of the rim, $z_F$ and $z_c$ as numbers of teeth on the flexible external gear and rigid internal gear, respectively, h as a distance along a flexible external gear tooth body center line between a point at which a normal of the meshing center tooth profile intersects the tooth body center line and a point on the rim neutral line, and $r_n$ as a radius of a rim neutral circle prior to deformation, an amount of flexing w of the opening portion is given by $$w = \frac{-b - \sqrt{b^2 - 4ac}}{2a}$$

$$a = \frac{3z_F}{r_n}\cos(2\theta)$$

$$b = z_C - z_F + 3z_F \frac{r_n + h}{r_n}\cos^2(2\theta) - z_c\sqrt{1 + 3\cos^2(2\theta)} \times$$
$$[2\sin\{\tan^{-1}(\cot^3\theta) + \theta\} - \sin(2\theta)\cos\{\tan^{-1}(\cot^3\theta) - \theta\}]$$

$$c = (r_n + h)(z_C - z_F)\cos(2\theta)$$

the rigid internal gear having a first tooth profile that is a tooth profile generated on the rigid internal gear by the arc tooth profile of the flexible external gear at the meshing center or a tooth profile that is an approximation thereof, and a second tooth profile that extends to a tooth crest adjoining the first tooth profile that is a tooth profile generated on the rigid internal gear tooth profile by the arc tooth profile of the flexible external gear or a tooth profile that is an approximation thereof in a section of the external teeth of the flexible external gear perpendicular to the axis at the diaphragm end.

The first tooth profile of the rigid internal gear may be an arc tooth profile or an involute tooth profile that is an approximation thereof having a radius that is at least a radius that satisfies an Euler-Savari equation corresponding to the arc tooth profile of the flexible external gear in the section of the opening portion of the flexible external gear perpendicular to the axis.

That is, in accordance with the present invention, the principal tooth profile of the flexible external gear is an arc, and a point away from the major axis of the neutral curve of the rim of the flexible external gear at the opening portion of the flexible external gear is selected as the main meshing position. This main meshing position is given at the angle of inclination to the rim neutral curve of $\theta$. The linear generatrix of the neutral plane of the rim (the linear generatrix of the neutral curved surface of the rim cylinder prior to deformation) at this position is projected onto the section perpendicular to the axis of the flexible external gear in a direction that coincides with the direction of the arc tooth profile of the flexible external gear. By selecting an amount of flexing of the opening portion of the flexible external gear so that the arc profile fulfills the contact condition, a first tooth profile of the rigid internal gear is defined in which the tooth contact is extended inwards from the opening portion towards the tooth trace. Moreover, in a section perpendicular to the inner end (the diaphragm-side end) of the flexible external gear axis, a second tooth profile of the rigid internal gear is defined to provide continuous meshing contact with the arc tooth profile of the flexible external gear.

By thus defining the tooth profiles of both gears, wide-area meshing of the two tooth profiles is realized, reducing bottom rim stress and stress in the vicinity of the long axis of the inner rolling contact surface of the wave generator, thereby increasing the load capability of the wave gear drive.

The above and other objects, characteristic features and advantages of the present invention will become more apparent to those skilled in the art as the disclosure of the present invention is made hereinbelow with reference to the accompanying drawings.

BEST MODE FOR CARRYING OUT THE INVENTION

Figure 1:
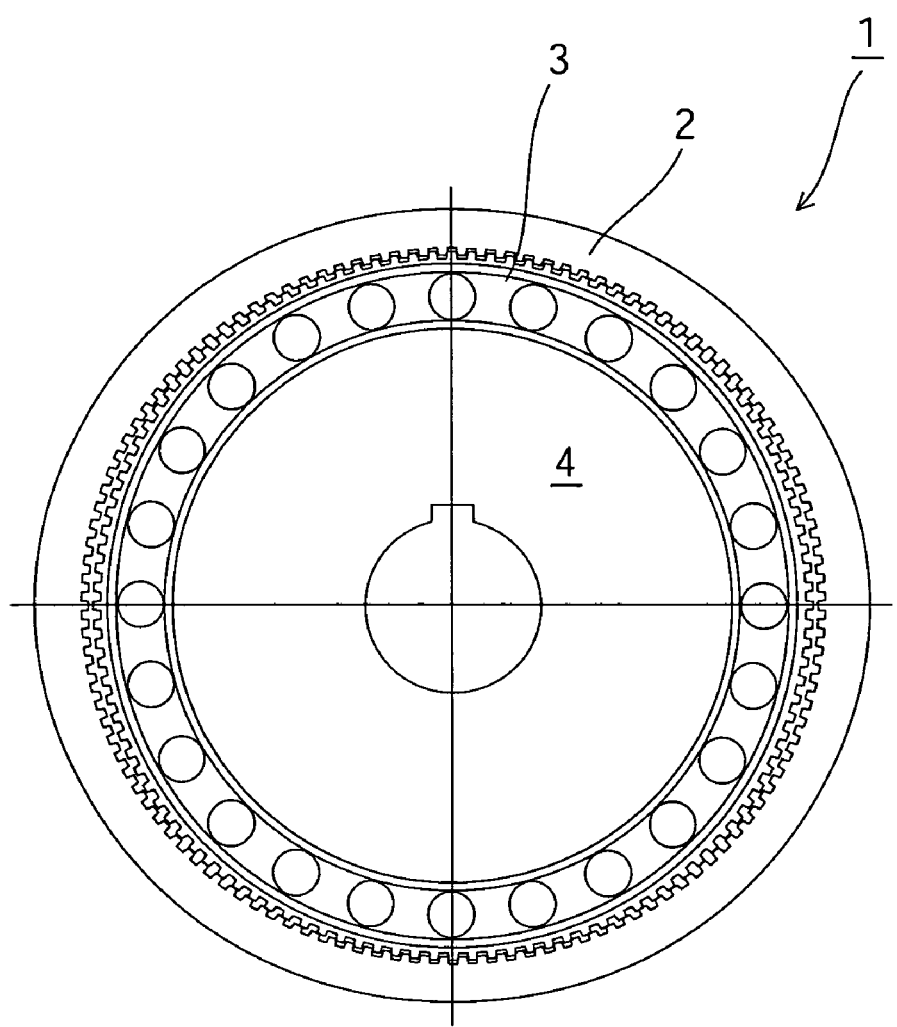
FIG. 1 shows a front view of an example of a typical cup-shaped wave gear device.
Figure 2:
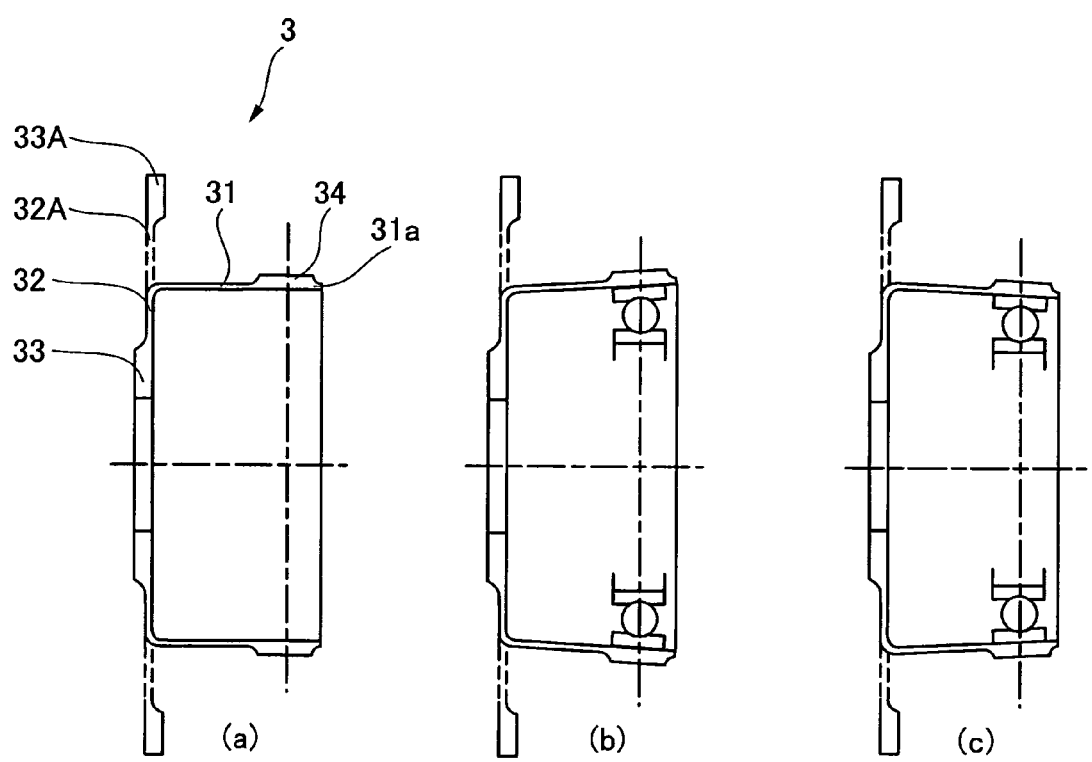
FIG. 2 shows explanatory views of the flexing of a cup-shaped or silk-hat-shaped flexible external gear at a section perpendicular to the axis, with (a) being the state before deformation, (b) being a section that includes the major axis of the gear, and (c) being a section that includes the minor axis of the gear.

The invention will now be described with reference to the drawings, starting with FIG. 1 showing a front view of an example of a cup-shaped wave gear drive, and FIG. 2 shows explanatory views of the flexing of a cup-shaped or silk-hat shaped flexible external gear. A wave gear drive 1 includes a circular rigid internal gear 2, a cup-shaped flexible external gear 3 concentrically disposed inside the rigid internal gear 2, and an elliptical wave generator 4. The cup-shaped flexible external gear 3 includes a cylindrical body 31, a diaphragm 32 that closes one end of the cylindrical body 31, a boss 33 formed integrally with a center part of the diaphragm 32, and external teeth 34 formed on an outside periphery at an opening portion 31a end of the cylindrical body 31.

As shown in FIG. 2, before the insertion of the wave generator 4, the body 31 of the cup-shaped flexible external gear 3 is cylindrical, but fitting the elliptical wave generator 4 into the opening portion 31a side flexes the opening portion 31a side into an elliptical shape, with the ellipse flexing outward along its major axis and flexing inward along its minor axis. The amount of flexing of the cylindrical body 31 increases in proportion to the distance from the diaphragm 32 end to the opening portion 31a, and is at a maximum at the opening portion 31a.

There is known a wave gear drive having a silk-hat-shaped flexible external gear that includes a diaphragm 32A that extends outwards from the end of the cylindrical body 31, and an annular boss 33A continuous with the outer edge of the diaphragm 32A, as shown in FIG. 2. The present invention can also be applied to this silk-hat-shaped wave gear drive.

In the following explanation, the difference between the number of teeth $z_C$-$z_F$ of the rigid internal gear 2 and the flexible external gear 3 is 2n (n being a positive integer).

Figure 3:
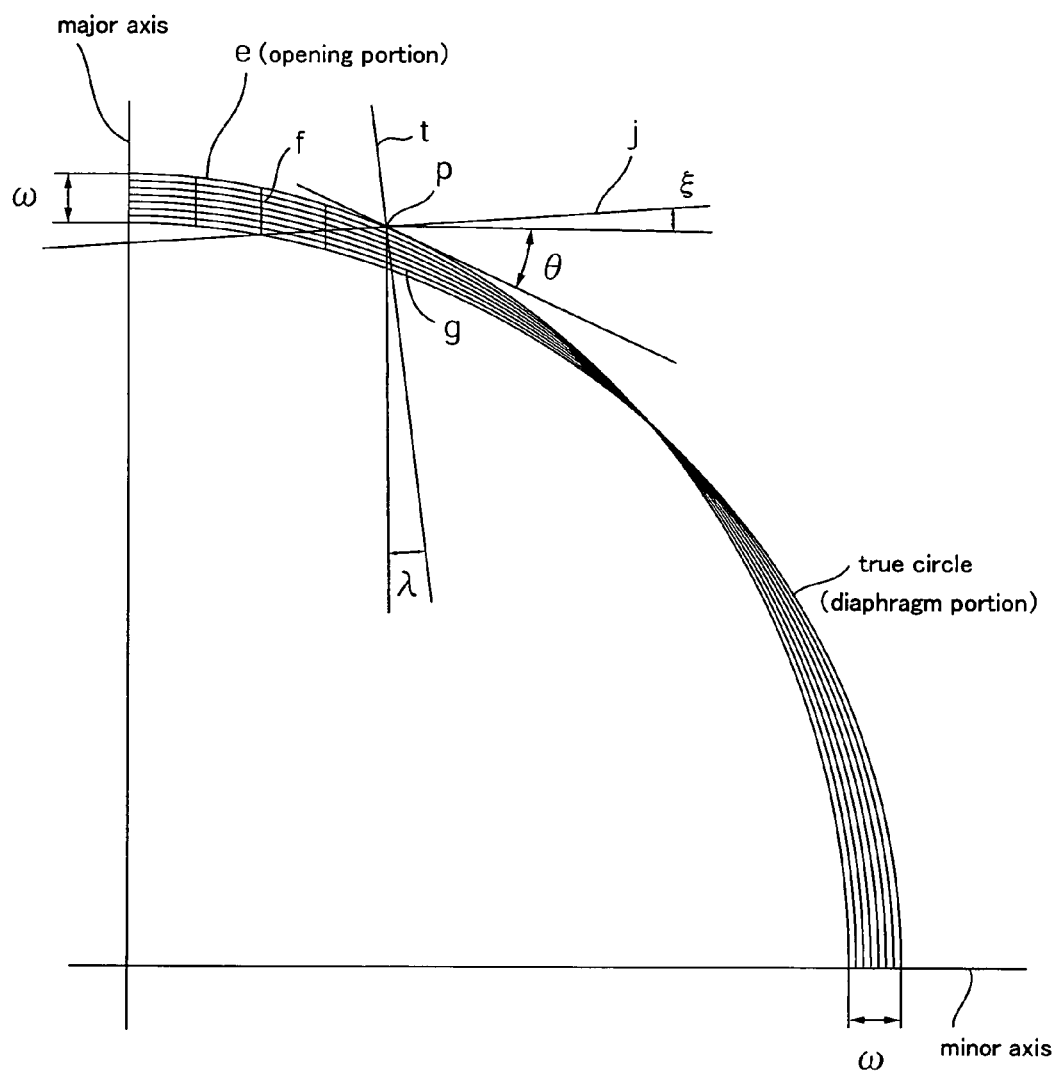
FIG. 3 is an explanatory view of a method of realizing tooth contact in the direction of the tooth trace.

Also, the shape of the neutral curve of the rim of the opening portion 31a of the flexible external gear 3 is an approximated ellipse expressed by the following tangential polar coordinates obtained by superimposing on the true circle of radius $r_n$ a sine wave having a total amplitude of 2k m (where k is the flexing coefficient and m is a module) at the opening portion. $p = r_n + w\cos(2\theta)(0 \leq \theta \leq 2\Pi)$ Here, p: vertical distance from origin 0 to tangent on rim neutral curve $r_n$: radius of true circle of rim neutral line prior to deformation w: amount of flexing on major and minor axes of rim neutral curve $\theta$ : angle of inclination of the tangent (normal) to the minor (major) axis of the rim neutral curve FIG. 3 shows neutral curves on a plurality of sections perpendicular to the axis that includes a section from the opening portion 31a to the diaphragm 32 of the neutral curved surface of the body 31 of the flexible external gear 3, projected axially onto the section of the opening portion. In the drawing, the true circle is the diaphragm end 31b of the body 31 and curves e show the projected rim neutral curves of the sections of the opening portion 31a, respectively. w shows the amount of flexing of the section of the opening portion determined in accordance with the number of teeth $z_C$, $z_F$ on the gears. Each of the plurality of curves f shown in the drawing is the approximated projection of a plurality of points on the cylindrical generatrix of the neutral curved surface of the rim cylinder prior to deformation (the neutral cylindrical plane of the rim).

First, at the section of the opening portion, a representative point P of a principal meshing region is determined on the rim neutral curve e of the said section, away from the major axis. The angle of inclination $\theta$ of the neutral curve tangent at point P is obtained. A range of 0° to 45° is used for $\theta$. An approximated projected curve g is drawn through point P and a tangent t of the projected curve g at point P is drawn. The angle of inclination $\lambda$ of the tangent t to the major axis can be obtained from the following equation using $\theta$ as a function on the neutral curve of the rim.

$$\lambda = \tan^{-1}\left[\frac{\sin\theta - \cos\theta\sin\theta(2\theta) + \frac{1}{3}\sin(3\theta)}{\cos\theta - \sin\theta\sin(2\theta) - \frac{1}{3}\cos[3\theta]}\right] = \tan^{-1}(\tan^3\theta)$$

One of the main aims of the present invention is to determine the pressure angle of both gears at which a line j normal to a tangent t drawn through the approximated projected curve g of the neutral cylinder generatrix g coincides with the direction of the common normal line of the tooth profiles at the point of contact between the two gears. Doing this makes it possible to substantially realize meshing in the direction of the tooth trace, from the section of the opening portion towards the inner end, without relieving. By picturing the movement of the tooth profile of the flexible external gear along the tooth trace, it can be seen that meshing in the direction of the tooth trace can thus be achieved.

Figure 4:
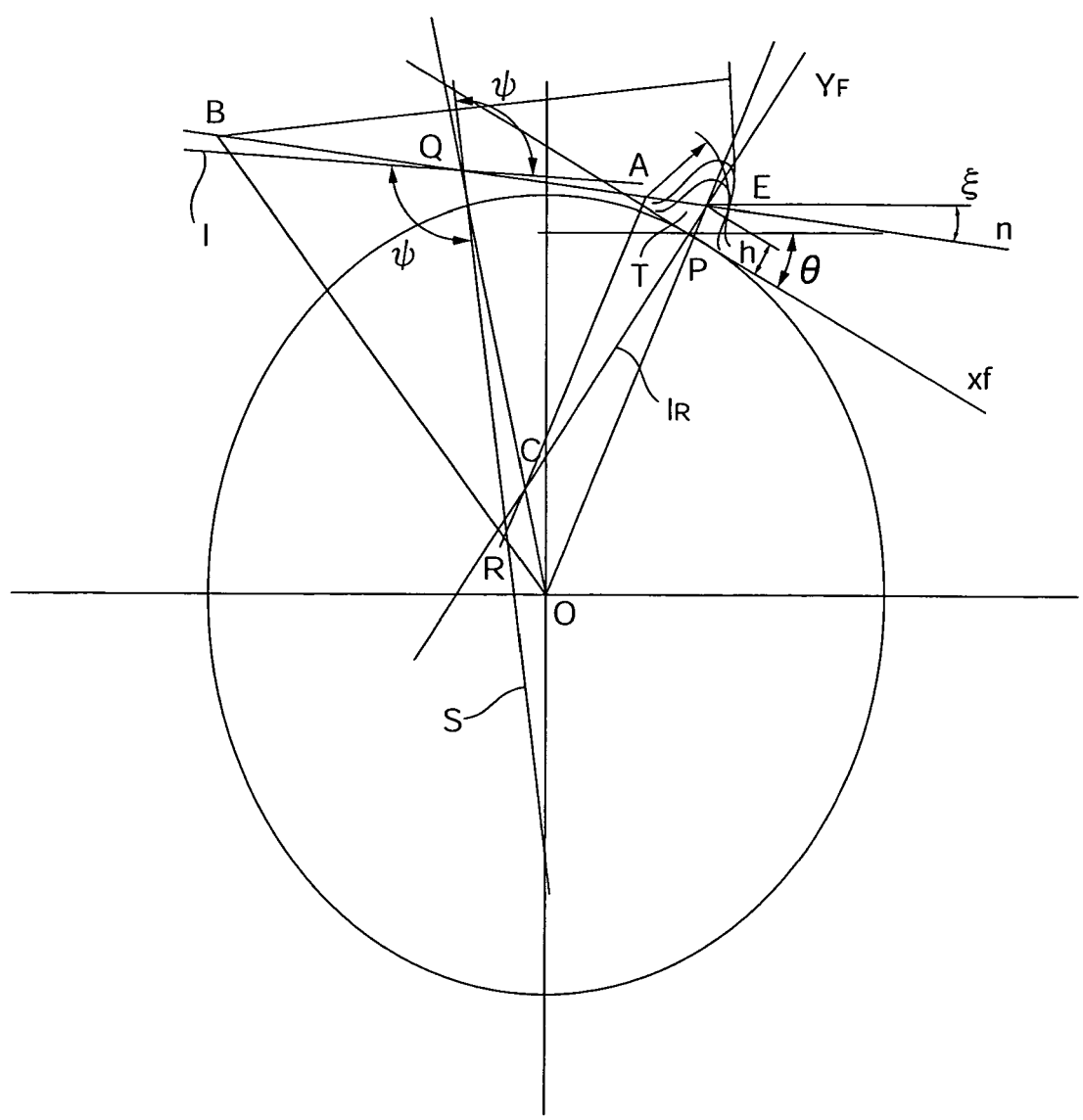
FIG. 4 is an explanatory view of the structural relationship of the meshing of a flexible external gear and rigid internal gear at a section of the opening portion, forming the basis of the tooth profile formation.

FIG. 4 is an explanatory sectional view of the opening portion, showing the relative motion at a point of contact E between the teeth of the two gears at the main meshing region. An essential condition for meshing to occur at point E is that at the time of the meshing of a tooth of the flexible external gear 3 with the teeth of the rigid internal gear 2, a common normal line n of the tooth profiles of both gears at point E passes through the instantaneous center Q of relative motion. By introducing this condition, the amount of flexing w is set as a matter of course when θ is given. That is, on the rim neutral line of the section of the opening portion that determines the main meshing region, the angle of inclination θ of the tangent of the neutral line of the rim and the amount of flexing w of the flexible external gear 3 are interrelated variables, and the relationship between the two is derived from the following consideration.

Select a tooth T among those of the flexible external gear 3 at θ, and provide the coordinate axes $x_F$, $y_F$ on the tooth T having the origin located at point P where the neutral line of the rim and the tooth body center line of the tooth T (which coincides with the normal $1_R$ to the neutral line of the rim) intersect. Then assume a case in which the wave generator 4 is fixed and the rigid internal gear 2 is driven by the flexible external gear 3. A center of curvature C of a neutral line at point P along the normal $1_R$ of the neutral line of the rim is the instantaneous center of movement of the tooth T of the flexible external gear 3 at that time. The instantaneous rotational speed of the tooth T at this time can be obtained from the peripheral speed of the neutral line of the rim as determined by the steady-state rotational speed of the flexible external gear 3. With the rotation of the rigid internal gear 2 being in a steady state, the center thereof is origin O, and as in the case of an ordinary gear, the ratio of the instantaneous rotational speed thereof to the steady-state rotational speed of the flexible external gear 3 is equal to the reciprocal of the gear ratio.

Therefore, the instantaneous center Q of the relative motion between the tooth T of the flexible external gear 3 and the rigid internal gear 2 is located at a point on a line extended through OC where OC externally divides the reciprocal of the instantaneous rotational speeds of the two gears. A line QE that connects the flexible external gear 3 tooth contact point E and point Q is normal to the tooth profile contact. Based on the above, the angle ξ of the normal of the contact at point E to the horizontal axis can be obtained by the following equation in which the point at which normal of the contact coordinate $y_F$ intersects the $y_F$ axis is h.

-continued $$b = z_C - z_F + 3z_F \frac{r_n + h}{r_n} \cos^2(2\theta) - z_C \sqrt{1 + 3\cos^2(2\theta)} \times$$
$$[2\sin\{\tan^{-1}(\cot^3\theta) + \theta\} - \sin(2\theta)\cos\{\tan^{-1}(\cot^3\theta) - \theta\}]$$

$$c = (r_n + h)(z_C - z_F)\cos(2\theta)$$

The tooth profile generated by the motion, relative to the rigid internal gear 2, of the arc tooth profile of the flexible external gear 3 thus determined, or an approximated tooth profile thereof (an involute tooth profile, for example) is taken as the first tooth profile of the rigid internal gear 2. In doing this, the following has to be taken into consideration, with respect to the radius of the arc tooth profile. p That is, considering the fixed pitch curves (which normally correspond to the pitch circle of the gears) of each gear representing the motion of the two gears that contact each other at Q, taking φ as the angle formed at point Q between the tangent 1 common to both pitch curves and OQ, a straight line s is drawn forming an angle φ with QE. Taking a point R on this line s, lines are drawn that connect R to C and to O and are extended to intersect QE, forming respective points of intersection A and B. In accordance with the Euler-Savari theorem applying to the variable speed ratio gear, these points A and B form centers of curvature of the tooth profiles of the flexible external gear 3 and the rigid internal gear 2 at point E.

In this case, the tooth profile of the flexible external gear 3 is convex, so that with respect to selecting the radius of the selected center of curvature A shown in the drawing, it is necessary to consider that in accordance with the Euler-Savari theorem, a circle of curvature of the tooth profile created on the rigid internal gear 2 will have a concave arc. Also, in cases in which an approximated curve, such as an involute curve, is substituted for the tooth profile of the rigid internal gear 2, the radius of the circle of curvature at the main meshing point E is set to be the same as, or greater than, the radius of the circle of curvature of the generated tooth profile of the rigid internal gear 2, as determined by the Euler-Savari theorem.

$$\xi = \tan^{-1}\left[\frac{(r_n + h + 1.5w)\cos\theta - 0.5w\cos(3\theta) - 2w\sin\zeta\sqrt{1 + 3\cos^2(2\theta)}\frac{z_C}{z_C - z_{FV}}}{(r_n + h - 1.5w)\sin\theta - 0.5w\sin(3\theta) + 2w\cos\zeta\sqrt{1 + 3\cos^2(2\theta)}\frac{z_C}{z_C - z_{FV}}}\right]$$

where $$\zeta = \tan^{-1}(\cot^3\theta)$$

$$z_{FV} = z_F\left\{1 - \frac{3w}{r_R}\cos(2\theta)\right\}$$

Here, by assigning the condition ξ=λ (concerning λ, refer to FIG. 3), the relationship between the above w and θ can be obtained by the following equation.

$$w = \frac{-b - \sqrt{b^2 - 4ac}}{2a}$$

$$a = \frac{3z_F}{r_n}\cos(2\theta)$$

Figure 5:
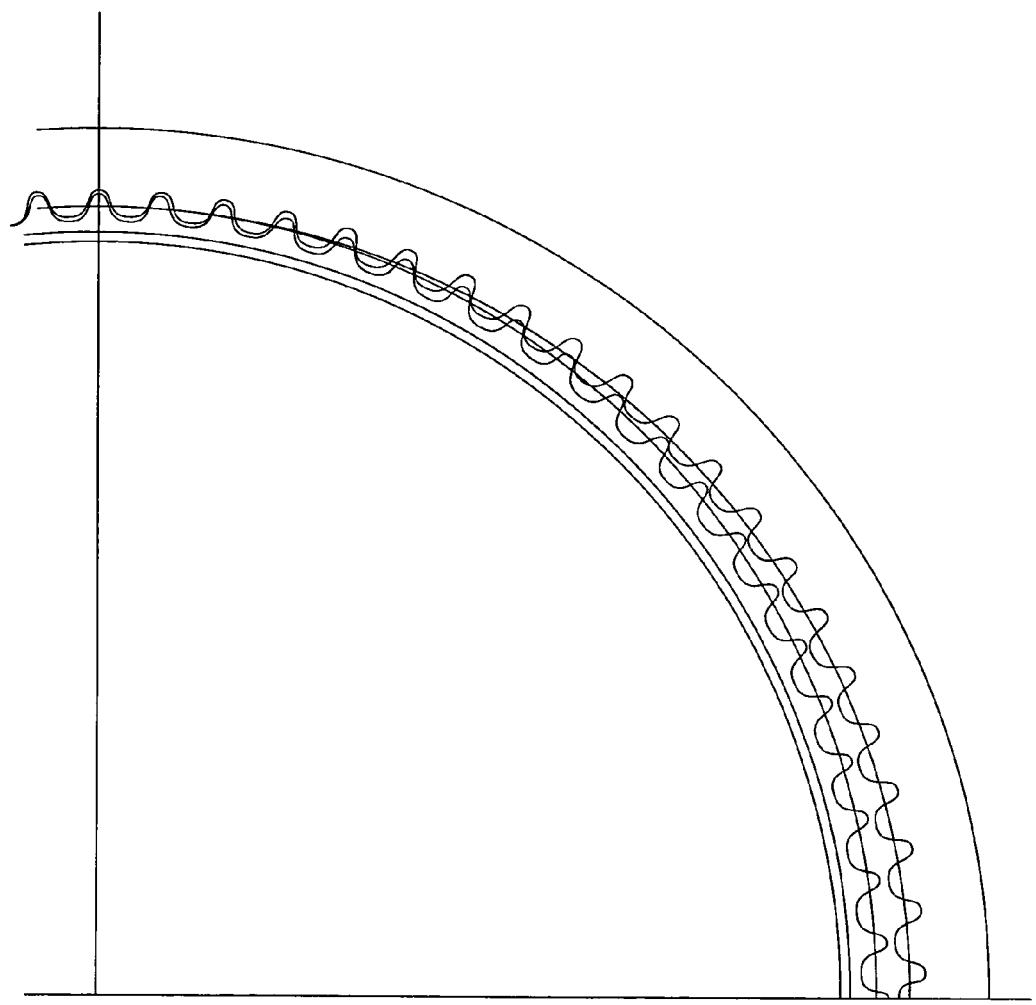
FIG. 5 is an example of the meshing of the tooth profiles according to the present invention, at a section of the opening portion.

FIG. 5 shows the arc tooth profile of the flexible external gear 3 meshing with the first tooth profile of the rigid internal gear 2, at a section of the opening portion of the flexible external gear 3 perpendicular to the axis. That is, the generating motion of the arc tooth profile is generating the first tooth profile of the rigid internal gear 2. In the drawing, the number of teeth $z_F$ is 80, the number of teeth $z_C$ is 82, the flexing coefficient κ of the section of the opening portion is 0.816, and the angle θ indicating the main meshing region is 20°.

Figure 6:
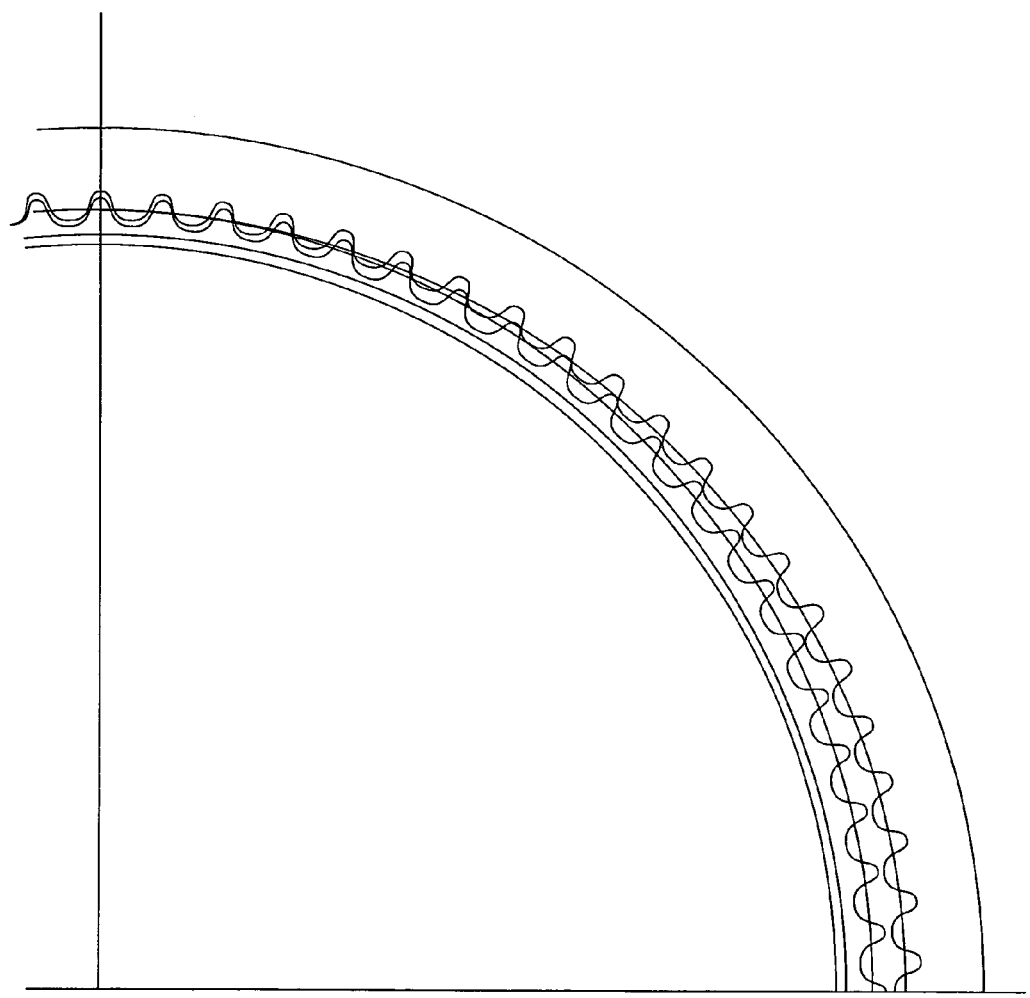
FIG. 6 is an example of the meshing of the tooth profiles according to the present invention, at a section of an intermediate part of the opening portion.

FIG. 6 shows the meshing state at an intermediate section of the tooth width, showing that there is no meshing interference.

Figure 7:
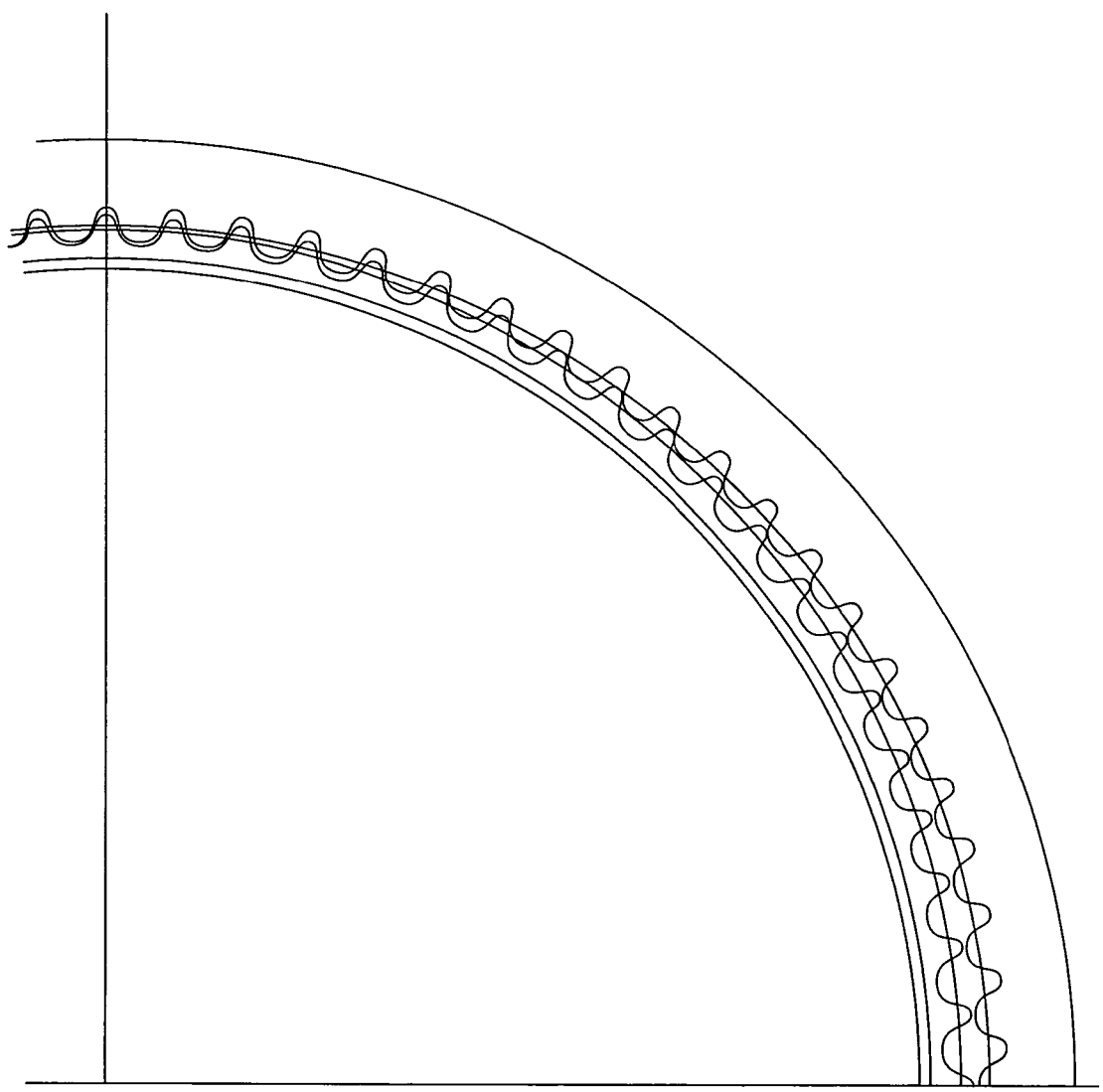
FIG. 7 is an example of the meshing of the tooth profiles according to the present invention, at a section of the inner end of the opening portion.

FIG. 7 shows the meshing of the arc tooth profile of the flexible external gear 3 with the second tooth profile of the rigid internal gear 2, at the inner end of the tooth width.

As described in the foregoing, the meshing of sections that include the opening portion sections takes place with the center thereof located away from the major axis (on a point along the tangent of the rim neutral line with a preset angle of θ). Therefore, stress produced by meshing of teeth at the opening portion section is manifested at locations at which bending stresses from the elliptical deformation is reduced, so the bending stress produced by the elliptical deformation of the rim of the flexible external gear 3 that is at a maximum at locations along the major axis, is not superimposed on the stresses produced by the meshing of the teeth. Combined with the effect of increasing the tooth contact in the direction of the tooth trace, and the meshing with the second tooth profile of the rigid internal gear 2 generated by the relative motion of the arc tooth profile of the flexible external gear 3 at the section of the inner end perpendicular to the axis, this increases the load capability of the flexible external gear 3.

In accordance with the present invention, moreover, the radial load component acting on the teeth acts on the wave generator balls under the teeth, having a good effect on the load distribution on the balls of the wave generator 4. That is, as with respect to the inner ring of the wave generator, it is possible to avoid the bending stresses produced by the elliptical deformation, which are at a maximum in the vicinity of the major axis, being superimposed on the ball load at those locations.

Thus, the region of main meshing between the rigid internal gear and the flexible external gear that takes place at the opening portion of the flexible external gear is set to take place away from the major axis of the flexible external gear. This enables continuous contact of the tooth profiles within the section of the opening portion and makes it possible to achieve the tooth contact along the tooth trace and the continuous contact at the inner end of the external teeth. Therefore, it is possible to reduce the stresses generated in the rim of the flexible external gear by the meshing of the teeth. Also, it is possible to prevent the superimposition of bending stresses produced by the elliptical deformation of the rim of the flexible external gear in the vicinity of the major axis. By thus helping to equalize the load on wave generator balls and avoid very high loads in the vicinity of the major axis, it is to greatly improve the load capability of the wave gear drive.

What is claimed is:

1. A wave gear drive having a rigid internal gear, a flexible external gear and a wave generator that flexes the external gear into an elliptical shape so that the external gear meshes partially with the rigid internal gear and rotates meshing portions of the two gears circumferentially, the flexible external gear comprising a cylindrical body, a diaphragm extending radially outward or inward from one end of the cylindrical body, and external teeth formed around an outer periphery of an opening portion at another end of the cylindrical body, the cylindrical body being flexed radially into an elliptical shape by the wave generator with an amount of said flexing in the radial direction increasing substantially proportional to a distance to the opening portion from the diaphragm side, wherein the flexible external gear is a spur gear and a main portion of a tooth profile thereof is an arc, in a section of said opening portion of the flexible external gear perpendicular to the axis, a meshing center between teeth of the two gears is at a point away from a major axis of a center line of an elliptical rim of the flexible external gear, with θ as an angle of inclination of a tangent with the meshing center along a neutral line of the rim, $z_F$ and $z_C$ as numbers of teeth on the flexible external gear and rigid internal gear, respectively, h as a distance along a flexible external gear tooth body center line between a point at which a normal of the meshing center tooth profile intersects the tooth body center line and a point on the rim neutral line and $r_N$ as a radius of a rim neutral circle prior to deformation, an amount of flexing w of the opening portion is given by $$w = \frac{-b - \sqrt{b^2 - 4ac}}{2a}$$

$$a = \frac{3z_F}{r_n}\cos(2\theta)$$

$$b = z_C - z_F + 3z_F \frac{r_n + h}{r_n}\cos^2(2\theta) - z_C\sqrt{1 + 3\cos^2(2\theta)} \times$$
$$[2\sin\{\tan^{-1}(\cot^3\theta) + \theta\} - \sin(2\theta)\cos\{\tan^{-1}(\cot^3\theta) - \theta\}]$$

$$c = (r_n + h)(z_C - z_F)\cos(2\theta)$$

the rigid internal gear having a first tooth profile that is a tooth profile generated on the rigid internal gear by the arc tooth profile of the flexible external gear at the meshing center or a tooth profile that is an approximation thereof, and a second tooth profile that extends to a tooth crest adjoining the first tooth profile that is a tooth profile generated on the rigid internal gear tooth profile by the arc tooth profile of the flexible external gear or a tooth profile that is an approximation thereof in a section of the external teeth of the flexible external gear perpendicular to the axis at the diaphragm-side end.

2. The wave gear drive according to claim 1, wherein the first tooth profile of the rigid internal gear is an arc tooth profile or an involute tooth profile that is an approximation thereof having a radius that is at least a radius that satisfies an Euler-Savari equation corresponding to the arc tooth profile of the flexible external gear in the section of the opening portion of the flexible external gear perpendicular to the axis.

* * * * *